J. Watson,
Shaft Coupling,
N° 50,190. Patented Sep. 26, 1865.
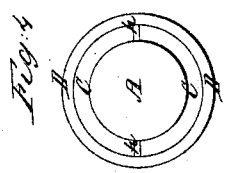
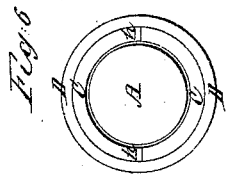
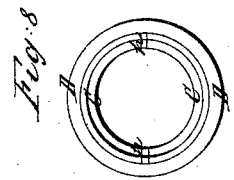
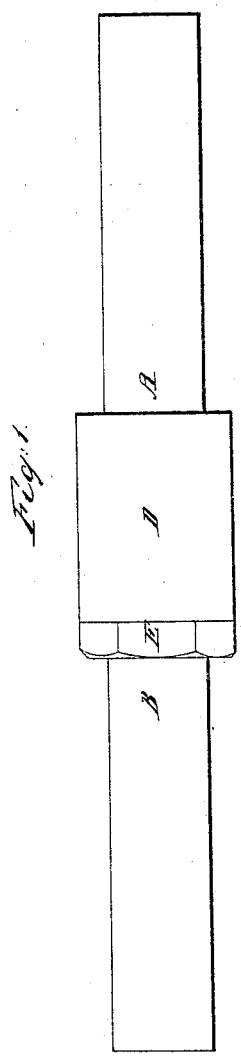
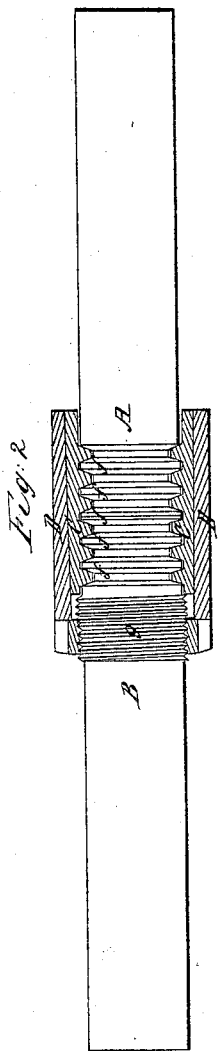
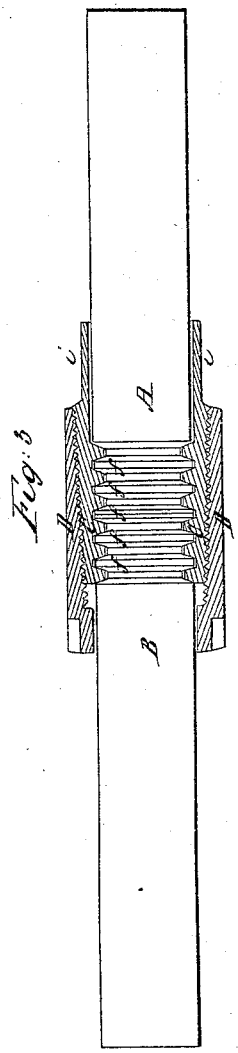
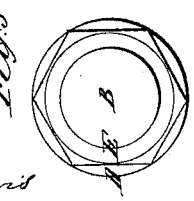
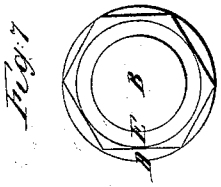
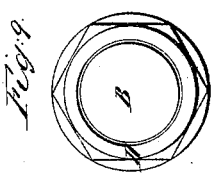
Witnesses
Henry G. Morris
Robt Briggs
Inventor
James Watson

UNITED STATES PATENT OFFICE.

JAMES WATSON, OF PHILADELPHIA, PENNSYLVANIA.

COUPLING FOR SHAFTS OF BORING-TOOLS.

Specification forming part of Letters Patent No. 50,190, dated September 26, 1865.

*To all whom it may concern:*

Be it known that I, JAMES WATSON, of Philadelphia, of the county of Philadelphia, in the State of Pennsylvania, have invented a new and improved coupling-joint applicable to the joints of oil or other Artesian well tools, and to shafting or other purposes wherein two cylindrical bodies are required to be connected at their ends; and I do hereby declare the following is a full and exact description thereof, which will enable others skilled in the art to make and use the same, reference being had to the accompanying drawings, forming part of this specification, in which—

Figure 1 is a side view. Fig. 2 is a section longitudinally through the coupling, with side view of the cylindrical bodies. Fig. 3 is a section longitudinally through the coupling, with side view of the cylindrical bodies joined, showing another mode of construction. Fig. 4 is an end view of the right-hand end, as drawn, of Fig. 1; and Fig. 5 is an end view of the left-hand end, as drawn, of Fig. 1. Fig. 6 is an end view of the right-hand end, as drawn, of Fig. 2. Fig. 7 is an end view of the left-hand end, as drawn, of Fig. 2. Fig. 8 is an end view of the right-hand end, as drawn, of Fig. 3. Fig. 9 is an end view of the left-hand end, as drawn, of Fig. 3.

The letters of reference indicate in all the views similar parts.

Upon the ends of the two pieces of Artesian or oil well tools, shafting, or cylindrical bodies which are to be connected or coupled together, and which are shown by A A B B on the drawings, are to be formed, in the solid metal of said shafts, a number of collars, $fffff$, which I prefer should have the form of a truncated or V screw-thread. These collars rest in grooves of corresponding form made in the shell C C. This shell is parted at $h\ h$ into two parts, but may be formed in three or more parts, if desirable, in practice. The external surface of the shell C C is conical, and is embraced and confined by the sleeve D D, which fits upon it.

In Figs. 1 and 2 is shown, upon the shaft B, near the collar $ff$, the screw-thread $g$, the root of which thread is made as large as, in diameter, or larger than, the external diameter of the collars $ff$ on the body of shaft B, so that the nut E can be run from the end upon B. The internal diameter of D also must be such as will allow it to pass over the thread $g$. The nut E thus serves to crowd down the conical sleeve D upon the conical shell C C, which is thus made to compress upon the collars $ffff$ and constitute the coupling. Upon releasing or unscrewing the nut E the sleeve D can be slipped off from the shell C C, when the separate pieces of C C can be removed and the coupling will be disconnected.

In place of using the nut E and the screw-thread $g$, the coupling may be constructed as shown in Fig. 3—that is, by making a male-screw on the external conical surface of the shell C C, and by making a female screw on the internal conical surface of the sleeve D. The shell C C can be held from turning by the portion $i\ i$, and the sleeve D be secured upon C C, and thus constitute the coupling. By unscrewing D from off of C C the coupling will be disconnected.

I am aware that the device of placing a shell in halves or pieces upon turned rings or collars upon which a band shall have been planed, (which band may have been driven, or shrunk by cooling, or screwed,) has been before used in forming collars upon cylindrical shafts in different parts of their lengths or at their ends; but

I claim as my invention and desire to secure by Letters Patent—

1. The construction of a coupling-joint by means of collars $ff$, formed in the solid metal near to the ends of the pieces of cylindrical bodies to be joined, the shell C C, in two or more parts, with its external conical form, and the sleeve D, with its internal conical form, coupling the above parts, as described.

2. The thread $g$, with the nut E, in combination with the sleeve D, in this manner, for the purpose described.

3. The formation of a taper thread on the shell C C and within the sleeve D, in the manner and for the purpose described.

JAMES WATSON.

Witnesses:
HENRY G. MORRIS,
ROBT. BRIGGS.